(12) United States Patent
Cho et al.

(10) Patent No.: US 11,175,696 B2
(45) Date of Patent: Nov. 16, 2021

(54) DISPLAY DEVICE

(71) Applicant: Samsung Display Co., LTD., Yongin-si (KR)

(72) Inventors: Sunhaeng Cho, Hwaseong-si (KR); Min-Sung Kim, Hwaseong-si (KR); Hyoyul Yoon, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/916,511

(22) Filed: Jun. 30, 2020

(65) Prior Publication Data

US 2021/0141416 A1 May 13, 2021

(30) Foreign Application Priority Data

Nov. 13, 2019 (KR) .......................... 10-2019-0145333

(51) Int. Cl.
*G06F 1/16* (2006.01)
*G09F 9/30* (2006.01)

(52) U.S. Cl.
CPC ............ *G06F 1/1616* (2013.01); *G09F 9/301* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,164,208 B2* | 12/2018 | Lee | .......................... | B32B 25/20 |
| 10,374,191 B2 | 8/2019 | Jung et al. | | |
| 2016/0209874 A1* | 7/2016 | Choi | ...................... | H05K 1/028 |
| 2018/0366679 A1 | 12/2018 | Kim et al. | | |
| 2019/0208649 A1* | 7/2019 | Jeon | ...................... | G06F 1/1652 |
| 2019/0305238 A1* | 10/2019 | Shin | ...................... | H01L 27/323 |
| 2019/0377383 A1* | 12/2019 | Kim | ...................... | G06F 1/1616 |
| 2020/0019212 A1* | 1/2020 | Jung | ...................... | G06F 1/1641 |
| 2020/0022267 A1* | 1/2020 | Han | .......................... | B32B 3/04 |
| 2020/0057471 A1* | 2/2020 | Nam | ...................... | G06F 1/1652 |
| 2020/0142447 A1* | 5/2020 | Yoon | ...................... | G06F 1/1643 |
| 2020/0175897 A1* | 6/2020 | Choi | ...................... | H05K 5/0017 |
| 2020/0183457 A1* | 6/2020 | Youn | ...................... | G06F 1/1652 |
| 2020/0260596 A1* | 8/2020 | Park | ...................... | B32B 27/30 |
| 2020/0260597 A1* | 8/2020 | Yoon | ...................... | H05K 5/0226 |

(Continued)

FOREIGN PATENT DOCUMENTS

KR 1020180079091 A 7/2018
KR 1020180138249 A 12/2018

(Continued)

*Primary Examiner* — Lisa Lea-Edmonds
(74) *Attorney, Agent, or Firm* — Cantor Colburn LLP

(57) ABSTRACT

A display device includes a display module which displays an image, the display module including: a folding region at which the display module is foldable and unfoldable, and a first non-folding region and a second non-folding region facing each other along a first direction with the folding region therebetween; a misalignment compensation member including an elastic fiber; a first support plate facing the first non-folding region of the display module with the misalignment compensation member therebetween; and a second support plate separated from the first support plate along the first direction and facing the second non-folding region of the display module with the misalignment compensation member therebetween.

20 Claims, 10 Drawing Sheets

(56) References Cited

U.S. PATENT DOCUMENTS

| | | | | |
|---|---|---|---|---|
| 2020/0273381 A1* | 8/2020 | Shin | ................... | G06F 1/1652 |
| 2020/0326750 A1* | 10/2020 | Kim | ................... | G06F 1/1643 |
| 2021/0034118 A1* | 2/2021 | Lee | ................... | G06F 1/1616 |
| 2021/0109566 A1* | 4/2021 | Myeong | ............... | G06F 1/1652 |
| 2021/0118337 A1* | 4/2021 | Park | ..................... | G09F 9/301 |
| 2021/0120683 A1* | 4/2021 | Park | .................... | H05K 5/0017 |

FOREIGN PATENT DOCUMENTS

| KR | 1020190003257 A | 1/2019 |
|---|---|---|
| KR | 1020190004410 A | 1/2019 |
| KR | 1020190021738 A | 3/2019 |

\* cited by examiner

DISPLAY DEVICE

This application claims priority to Korean Patent Application No. 10-2019-0145333, filed on Nov. 13, 2019, and all the benefits accruing therefrom under 35 U.S.C. § 119, the entire contents of which are hereby incorporated by reference.

BACKGROUND

(1) Field

The present disclosure herein relates to a display device, and more particularly, to a foldable display device.

(2) Description of the Related Art

An electronic device, such as a television, a mobile phone, a tablet computer, a navigator or a game player, is provided with a display device for providing information.

Various types of display devices are being developed with development of techniques of the display device. For example, flexible display devices, which are foldable (or bendable) or rollable, are being developed. Flexible display devices, the shapes of which may be modified in various ways, are easily portable and may improve a user's convenience.

SUMMARY

The present disclosure provides a display device of which durability and display quality are enhanced.

An embodiment of the invention provides a display device including: a display module which displays an image, the display module including: a folding region at which the display module is foldable and unfoldable, and a first non-folding region and a second non-folding region facing each other along a first direction with the folding region therebetween; a misalignment compensation member including an elastic fiber; a first support plate facing the first non-folding region of the display module with the misalignment compensation member therebetween; and a second support plate separated from the first support plate along the first direction and facing the second non-folding region of the display module with the misalignment compensation member therebetween.

In an embodiment, the display module which is unfolded disposes the misalignment compensation member corresponding to each of the first non-folding region, the second non-folding region and the folding region of the display module.

In an embodiment, a thickness of the misalignment compensation member may be about 30 micrometers (µm) to about 300 µm.

In an embodiment, the display device may further include a first adhesive member between the misalignment compensation member and the display module.

In an embodiment, the display device may further include: a first sub-adhesive member between the misalignment compensation member and the first support plate; and a second sub-adhesive member between the misalignment compensation member and the second support plate.

In an embodiment, the elastic fiber may include a high density and high elasticity fiber.

In an embodiment, the elastic fiber may include a water-resistant fiber.

In an embodiment, a rigidity of each of the first support plate and the second support plate, may be larger than a rigidity of the display module.

In an embodiment, the folding region of the display module may be in-folded so as to dispose portions of a display surface, on which the image is displayed, facing each other.

In an embodiment, the display module may further include: a display panel which generates and displays the image; a cushion layer facing the display panel; and a cushion adhesive layer between the display panel and the cushion layer.

In an embodiment, the cushion layer may include polyurethane, plastic polyurethane or and a urethane rubber.

In an embodiment of the invention, a display device includes: a display module which displays an image, the display module including: a folding region at which the display module is foldable and unfoldable, and a first non-folding region and a second non-folding region facing each other along a first direction with the folding region therebetween; a support member which faces the first non-folding region and the second non-folding region of the display module; a misalignment compensation member including an elastic fiber, the misalignment compensation member facing the display module with the support member therebetween; a first frame facing the support member at the first non-folding region, with the misalignment compensation member therebetween; and a second frame separated from the first frame along the first direction and facing the support member at the second non-folding region, with the misalignment compensation member therebetween.

In an embodiment, the support member may include: a first support plate between the display module and the first frame; and a second support plate between the display module and the first frame, and separated from the first support plate along the first direction.

In an embodiment, the display device may further include: a first adhesive member between the display module and the first support plate; and a second adhesive member between the display module and the second support plate.

In an embodiment, the display device may further include: a third adhesive member between the first support plate and the misalignment compensation member; and a fourth adhesive member between the second support plate and the misalignment compensation member.

In an embodiment, a rigidity of each of the first support plate and the second support plate may be larger than a rigidity of the display module.

In an embodiment, the display device may further include: a fifth adhesive member between the misalignment compensation member and the first frame; and a sixth adhesive member between the misalignment compensation member and the second frame.

In an embodiment, the display module may further include: a display panel which generates and displays the image; a cushion layer facing the display panel; and a cushion adhesive layer between the display panel and the cushion layer.

In an embodiment, the folding region of the display module may be in-folded so as to dispose portions of a display surface, on which the image is displayed, facing each other.

In an embodiment, the elastic fiber may include a water-resistant high density and high elasticity fiber.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the invention. In the drawings.

DETAILED DESCRIPTION

Figure 1:
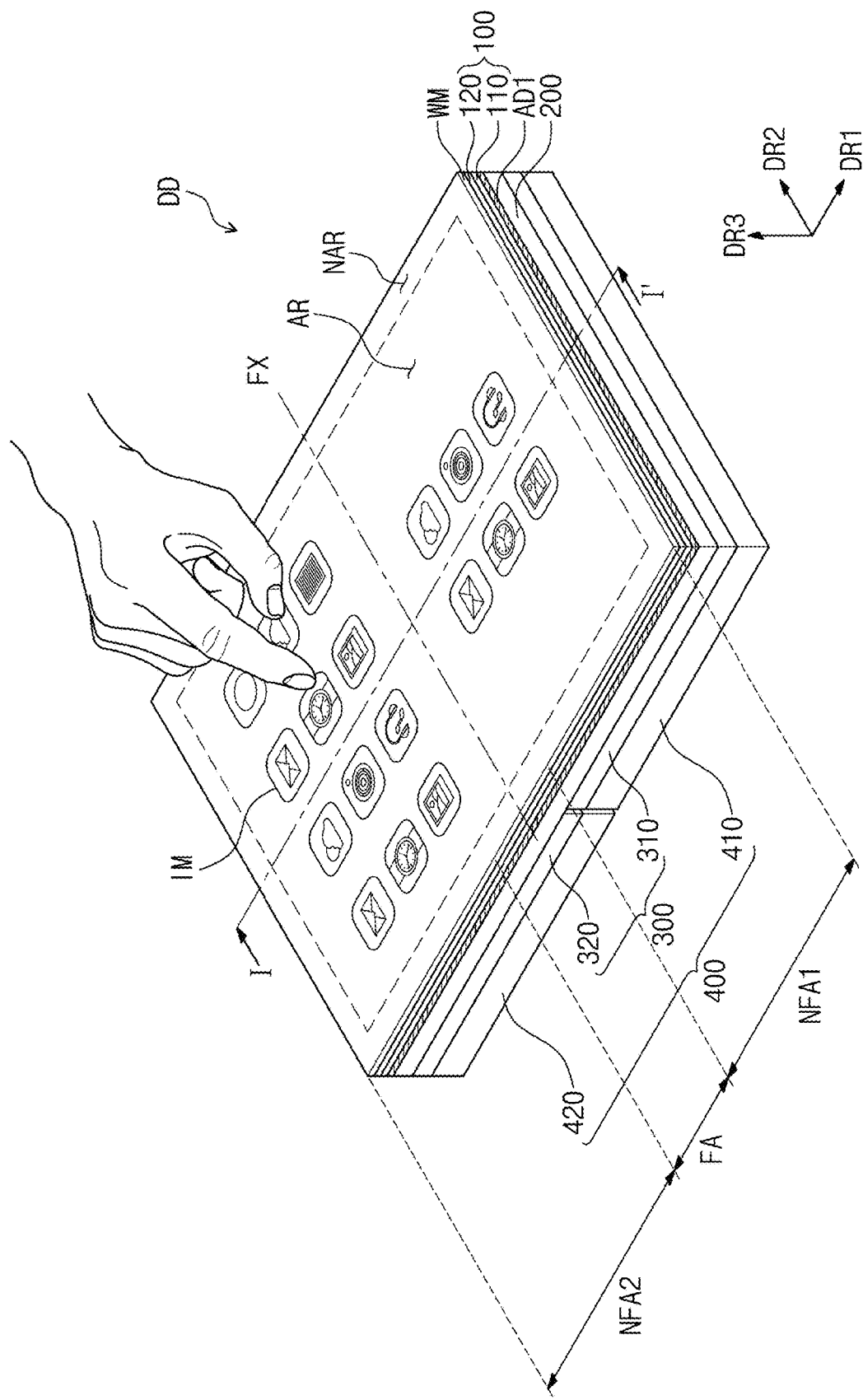
FIG. 1 is a perspective view of an embodiment of a display device.

Advantages and features of the invention, and methods for achieving the same will be explained with reference to exemplary embodiments described later in detail together with the accompanying drawings. However, the invention is not limited to the following exemplary embodiments, but realized in various forms. In other words, the present exemplary embodiments are provided just to complete disclosure the invention and make a person having an ordinary skill in the art understand the scope of the invention. The invention should be defined by only the scope of the accompanying claims. Throughout this specification, like numerals refer to like elements.

Terms such as first, second, and the like may be used to describe various components, but these components should not be limited by the terms. These terms are generally only used to distinguish one element from another. For instance, a first component may be referred to as a second component, or similarly, a second component may be referred to as a first component, without departing from the scope of the right of the present disclosure.

As used herein, the singular forms "a," "an," and "the" may be intended to include the plural forms as well, unless the context clearly indicates otherwise.

When an element or a layer is referred to as being related to another element such as being 'on' another element or layer, it can be directly on the other element or layer, or intervening layers or elements may also be present. In contrast, when an element or layer is referred to as being related to another element such as being "directly on" another element or layer, there are no intervening elements or layers present.

The term "and/or" includes any and all combinations of each and one or more of the associated listed items.

Spatially relative terms, such as "above," "upper," "beneath," "below," "lower," and the like, may be used herein for ease of description to describe one element or feature's relationship to other elements or features as illustrated in the figures. It will be understood that the spatially relative terms are intended to encompass different orientations of the device in use or operation in addition to the orientation depicted in the figures.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which example embodiments belong. In addition, it will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, components or combinations thereof, but do not preclude the presence or addition of one or more other features, integers, steps, operations, elements, components, or combinations thereof.

Example embodiments are described herein with reference to cross-sectional views and plan views that are ideal schematic illustrations of example embodiments. Accordingly, variations from the shapes of the illustrations as a result, for example, of manufacturing techniques and/or tolerances, are to be expected. Thus, exemplary embodiments should not be construed as limited to specific shapes illustrated herein but are to include deviations in shapes that result from manufacturing. Thus, the regions illustrated in the figures are schematic in nature and their shapes may be intended to illustrate the actual shape of a region of a device and are not intended to limit the scope of example embodiments.

Hereinafter, embodiments of the invention will be described with reference to the accompanying drawings.

Figure 2:
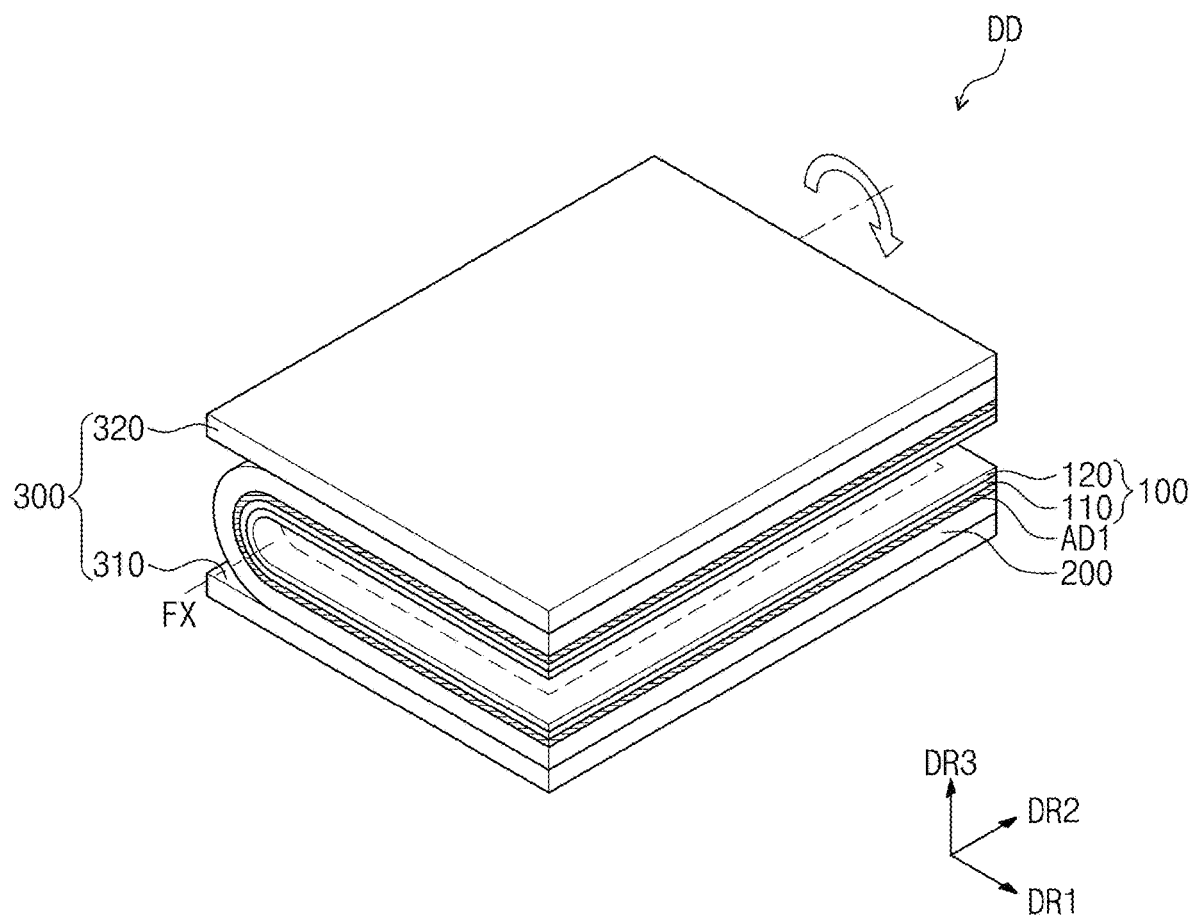
FIG. 2 is a perspective view of an embodiment of the display device illustrated in FIG. 1, which is in-folded.
Figure 3:
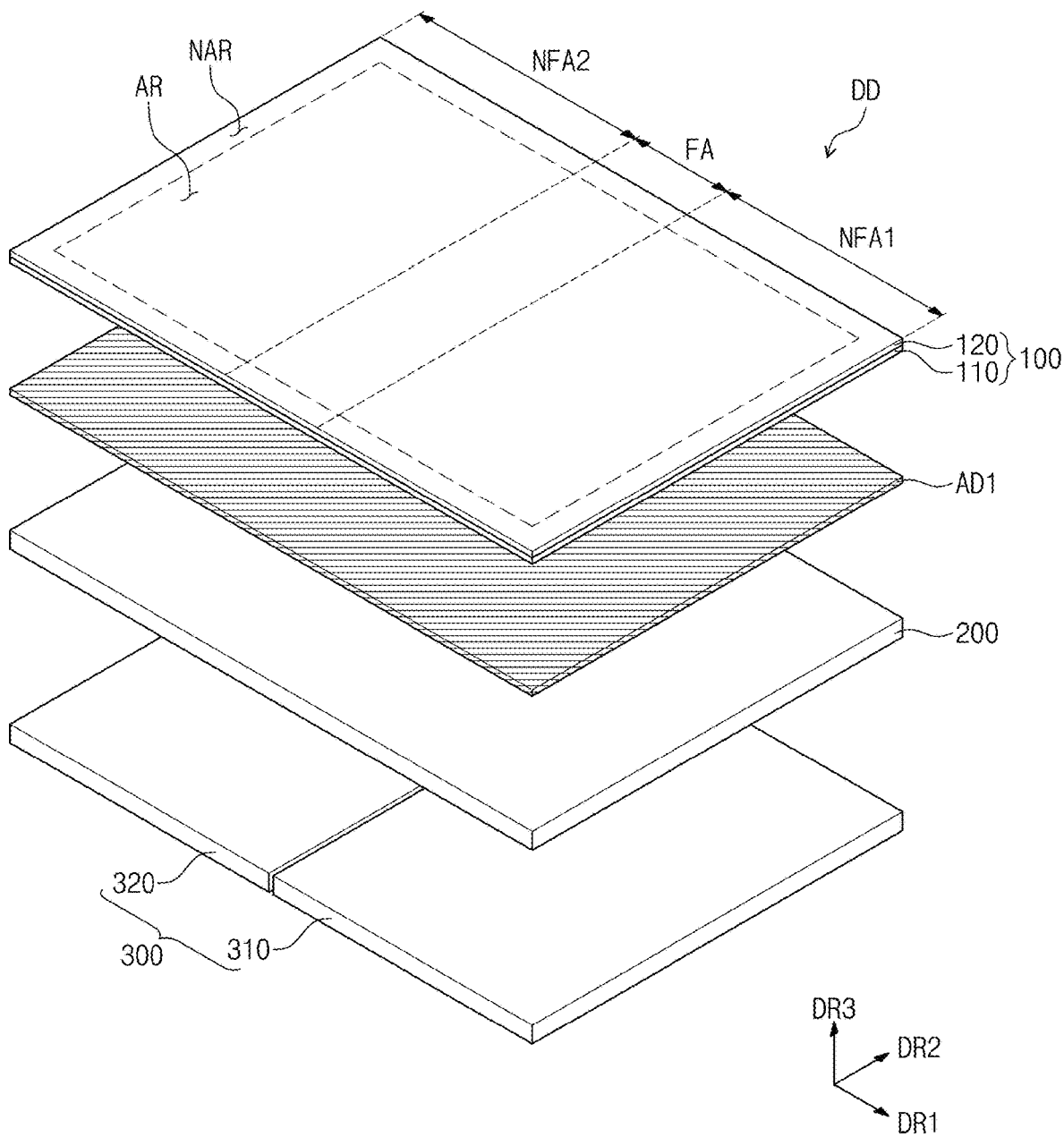
FIG. 3 is an exploded perspective view of an embodiment of the display device illustrated in FIG. 1.

FIG. 1 is a perspective view of an embodiment of a display device DD. FIG. 2 is a perspective view of an embodiment of the display device DD illustrated in FIG. 1 which is in-folded. FIG. 3 is an exploded perspective view of the display device DD illustrated in FIG. 1.

Referring to FIGS. 1 to 3, a display device DD has a rectangular shape having relatively long sides extending along a first direction DR1 and relatively short sides extending along a second direction DR2 that intersects with the first direction DR1. However, the display device DD is not limited thereto, and may have various shapes. The display device DD and components thereof may be disposed in a plane defined by the first direction DR1 and the second direction DR2, such as illustrate in FIG. 1. The display device DD and components thereof may define a thickness direction along a third direction DR3 which crosses each of the first direction DR1 and the second direction DR2.

The display device DD may be flexible. Specifically, the display device DD may be folded or unfolded on the basis of a folding axis FX (e.g., virtual folding axis) extending along a predetermined direction. In other words, the display device DD may be a foldable (e.g., folding) display device DD. In an embodiment, the folding axis FX extends along the second direction DR2.

The display device DD may be divided into or define a plurality of areas. Specifically, the display device DD may be divided into a folding area FA (e.g., folding region) at which the display device DD and components thereof are foldable and unfoldable, and a first non-folding area NFA1 and a second non-folding area NFA2 (e.g., first and second non-folding areas NFA1 and NFA2) at which the display device DD and components thereof remain substantially flat even when the display device DD is folded, arranged in a plan view. The first and second non-folding areas NFA1 and NFA2 may be individually referred to as a first non-folding region and a second non-folding region, or may be collectively referred to as a non-folding region. The folding area FA is a planar area to which a folding stress according to the folding of the display device DD is applied to the display device DD and various components thereof. The folding area FA overlaps the folding axis FX in a plan view, that is, a view along a thickness direction of the display device DD.

According to the embodiment, the folding area FA of the display device DD is defined between the first and second non-folding areas NFA1 and NFA2. That is, the first and second non-folding regions (e.g., first and second non-folding areas NFA1 and NFA2) are disposed facing each other along a first direction DR1 with the folding region (e.g., folding area FA) therebetween. The first non-folding area NFA1 is adjacent to a first side of the folding area FA along the first direction DR1, and the second non-folding area NFA2 is adjacent to a second side of the folding area FA along the first direction DR1, the second side being opposite to the first side.

The folding area FA, the first non-folding area NFA1 and the second non-folding area NFA2 may be defined in a plan view of members included in the display device DD. That is, components, layers, etc. of the display device DD may include the folding area FA, the first non-folding area NFA1 and the second non-folding area NFA2 described above.

In the present embodiment, one of the folding area FA is defined in the display device DD, but the invention is not limited thereto. According to another embodiment, the folding area FA may be provided in plurality (e.g., a plurality of folding areas) in the display device DD.

The display device DD may be in-folded. In other words, a top surface of the display device DD, which is defined as a display surface on which an image IM is displayed, may be foldable such that portions of the top surface face each other. Accordingly, the display device DD which is in-folded disposes the portions of the display surface of the display device DD covered with or overlapping the bottom surface, which is opposite to the display surface and therefore protected from an environment outside of the display device DD. In FIG. 1, for example, the top surface or display surface may be disposed furthest along a third direction DR3, while the bottom surface is furthest in a direction opposite to the third direction DR3.

However, the invention is not limited thereto. In another embodiment, the display device DD may be out-foldable so that portions of the top surface face outside the display device DD. In embodiments below, descriptions will be provided on the basis of the display device DD which is in-foldable.

The display device DD includes a display module 100, a window member WM (e.g., window), a misalignment compensation member 200, a support member 300 (e.g., supporter), and a frame 400.

The display module 100 may be divided into an active region AR and a non-active region NAR, in a plan view of a plane defined by the first direction DR1 and the second direction DR2. The active region AR is defined spaced apart from outer edges of the display module 100, such as being in a central portion of the display module 100 in a plan view. The non-active region NAR is adjacent to the active region AR, and may be closer to the outer edges of the display module 100 than the active region AR. The non-active region NAR may surround the active region AR. In the embodiment, the non-active region NAR is defined as a frame shape for surrounding the active region AR.

However, the invention is not limited to the shapes and the number of the active region AR and the non-active region NAR. The display module 100 according to another embodiment of the invention may only include the active region AR, or may include the active region AR provided in plurality (e.g., a plurality of active regions) separated from each other.

The display module 100 includes a display panel 110 and an input sensing member 120 (e.g., input sensing layer).

The display panel 110 may display an image IM (see FIG. 1) in the active region AR. Components of the display panel 110 may generate light, emit light and/or generate the image IM for displaying the image IM. The input sensing member 120 may be disposed on the display panel 110, and sense an external input (a touch, a pressure or the like) provided at the active region AR.

A window member WM provides or defines the front surface of the display device DD. The window member WM may be disposed on a front surface of the display module 100, to protect the display module 100. In an embodiment, for example, the window member WM may include a glass substrate, a sapphire substrate or a plastic film. The window member WM may have a multi-layer structure or a single layer structure. In an embodiment, for example, the window member WM may have a laminated structure of a plurality of plastic films bonded to each other such as with an adhesive, or a laminated structure of a glass substrate and a plastic film bonded to each other such as with an adhesive.

Even though FIG. 1 shows that the display device DD includes the window member WM, the window member WM will be omitted from the display device DD shown in the drawings below, for convenience of illustration.

The misalignment compensation member 200 is disposed under the display module 100. That is, the display device DD which is unfolded or flat (FIG. 1), disposes the misalignment compensation member 200 facing the window member WM with the display module 100 therebetween. The misalignment compensation member 200 has a plate shape. The misalignment compensation member 200 may include a fiber having a relatively high density and high elasticity. In addition, the misalignment compensation member 200 may be water-resistant such as including a water-resistant fiber.

The support member 300 is disposed under the misalignment compensation member 200 to support the display module 100 and the misalignment compensation member 200. That is, the display device DD which is unfolded or flat (FIG. 1), disposes the support member 300 facing the display module 100 with the misalignment compensation member 200 therebetween. The support member 300 has a plate shape. The rigidity of the support member 300 may be larger than a rigidity of the display module 100. In an embodiment, for example, the support member 300 may include a metal material. However, the invention is not particularly limited to a material of the support member 300.

The support member 300 may be fixed to the misalignment compensation member 200, such as by being adhered to the misalignment compensation member 200. When an external shock is applied to the display device DD or component thereof, the support member 300 may reduce a shear stress to be applied to the display module 100 owing to the external shock.

The support member 300 includes a first support plate 310 (e.g., first supporter) and a second support plate 320 (e.g., second supporter). The first support plate 310 is disposed to overlap or correspond to a first side of the display module 100 along the first direction DR1. The first support plate 310 may overlap or correspond to a first portion of the folding area FA and the first non-folding area NFA1 of the display module 100. In other words, the first support plate 310 may support the portions of the folding area FA and the first non-folding area NFA1 of the display module 100. The second support plate 320 is disposed to overlap or correspond to a second side of the display module 100 along the first direction DR1. The second support plate 320 may overlap or correspond to a second portion of the folding area FA and the second non-folding area NFA2 of the display module 100. The second support plate 320 may support the portions of the folding area FA and the second non-folding area NFA2 of the display module 100. The first support plate 310 and the second support plate 320 may be disposed to be separate from each other along the first direction DR1. That is, the display device DD which is unfolded or flat (FIG. 1 or FIG. 3), disposes the first support plate 310 and the second support plate 320 separated from each other along the first direction DR1.

The frame 400 is disposed under the support member 300. That is, the display device DD which is unfolded or flat (FIG. 1), disposes the frame 400 facing the misalignment compensation member 200 with the support member 300 therebetween. Although not shown in the drawing, the display device DD further includes a bottom case disposed under the frame 400. The bottom case may form a space with the frame 400, and components required to operate the display device DD, for example, a battery, a main printed circuit board ("PCB") or the like may be mounted in the space between the frame 400 and the bottom case. In another embodiment, the frame 400 may be a bottom case. In another embodiment, the frame 400 may be a jig for fixing the display module 100 in a production process within a method of manufacturing the display device DD. The frame 400 has a plate shape. The rigidity of the frame 400 may be larger than a rigidity of the misalignment compensation member 200. The frame 400 may include a first frame 410 and a second frame 420.

The first frame 410 overlaps or corresponds to a first portion of the folding area FA and the first non-folding area NFA2 of the display module 100. In other words, the first frame 410 may support portions of the folding area FA and the first non-folding area NFA1 of the display module 100, the misalignment compensation member 200 and the first support plate 310. The second frame 420 may overlap or correspond to a second portion of the folding area FA and the second non-folding area NFA2 of the display module 100. The second frame 420 may support portions of the folding area FA and the second non-folding area NFA2 of the display module 100, the misalignment compensation member 200 and the second support plate 320. The first frame 410 and the second frame 420 may be disposed to be separate from each other along the first direction DR1. That is, the display device DD which is unfolded or flat (FIG. 1 or FIG. 3), disposes the first frame 410 and the second frame 420 separated from each other along the first direction DR1.

Even though FIG. 1 illustrates that the display device DD includes each of the support member 300 and the frame 400, the display device DD may omit any one among the support member 300 and the frame 400.

In addition, even though FIG. 1 illustrates that the display device DD includes the frame 400, the frame 400 is omitted from the display device DD in some of the drawings below for convenience of illustration.

As shown in FIG. 3, a first adhesive member AD1 (e.g., first adhesive layer) may be disposed between the display module 100 and the misalignment compensation member 200. The first adhesive member AD1 combines the display module 100 and the misalignment compensation member 200 to each other, at the bottom surface of the display module 100 and the top surface of the misalignment compensation member 200. The first adhesive member AD1 may include a thermosetting resin or a photo-curable resin.

Figure 4:
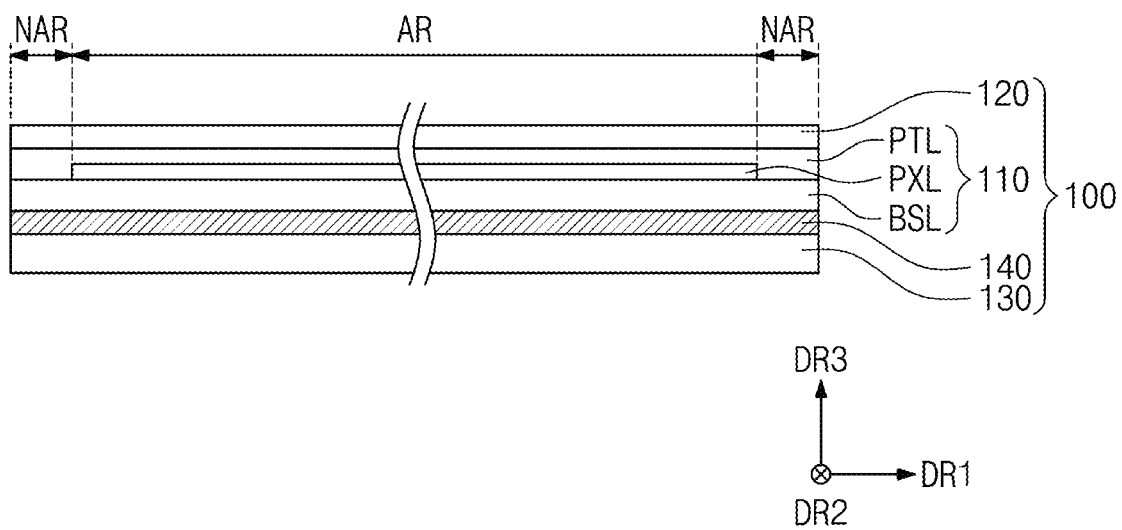
FIG. 4 is an enlarged cross-sectional view of an embodiment of a display module illustrated in FIGS. 1 and 3.

FIG. 4 is an enlarged cross-sectional view of a display module 100 illustrated in FIGS. 1 and 3.

Referring to FIG. 4, the display panel 110 includes a base layer BSL, a pixel layer PXL, and a protection layer PTL. The base layer BSL defines the bottom surface of the display module 100. The base layer BSL may include or be formed of a flexible material.

The pixel layer PXL is disposed on the base layer BSL. The pixel layer PXL includes a pixel provided in plurality (e.g., a plurality of pixels). The pixels receive electric signals to generate light, emit light and/or realize an image IM (shown in FIG. 1). The pixel layer PXL may correspond to the active region AR.

According to an embodiment, a type of the display panel 110 may be determined according to the composition of the pixel layer PXL. The display panel 110 may be any one among a liquid crystal display panel, an organic light emitting display panel, an electrophoretic display panel, an electrowetting display panel, or various other display panels capable of displaying an image. In addition, the display panel 110 of the invention may include various embodiments, and is not limited to any one embodiment.

The protection layer PTL is disposed on the pixel layer PXL to cover the pixel layer PXL. The protection layer PTL may electrically insulate the pixel layer PXL from the input sensing member 120. The pixel layer PXL may face the input sensing member 120 with the protection layer PTL therebetween, along a thickness direction of the display module 100.

In an embodiment, for example, the protection layer PTL may be an encapsulation layer for encapsulating the pixel layer PXL. Here, the protection layer PTL may include a plurality of laminated organic films and/or inorganic films.

Alternatively, the protection layer PTL may be a planarization layer for providing the top surface of the pixel layer PXL as flat. The protection layer PTL may be provided in various types, forms, materials, etc. and is not limited to any one embodiment.

The input sensing member 120 is disposed on the protection layer PTL of the display panel 110. The active region AR of the input sensing member 120 may substantially overlap or correspond to a planar area in which the pixel layer PXL is disposed.

The display module 100 may further include a cushion layer 130 and a cushion adhesive layer 140 (e.g., cushion fixing layer).

The cushion layer 130 is disposed under the display panel 110 and the cushion adhesive layer 140 may bond the display panel 110 to the cushion layer 130. The cushion layer 130 may absorb a shock applied to the bottom surface of the display panel 110, to protect the display panel 110. The cushion layer 130 may include any one among polyurethane, plastic polyurethane and a urethane rubber.

Figure 5:
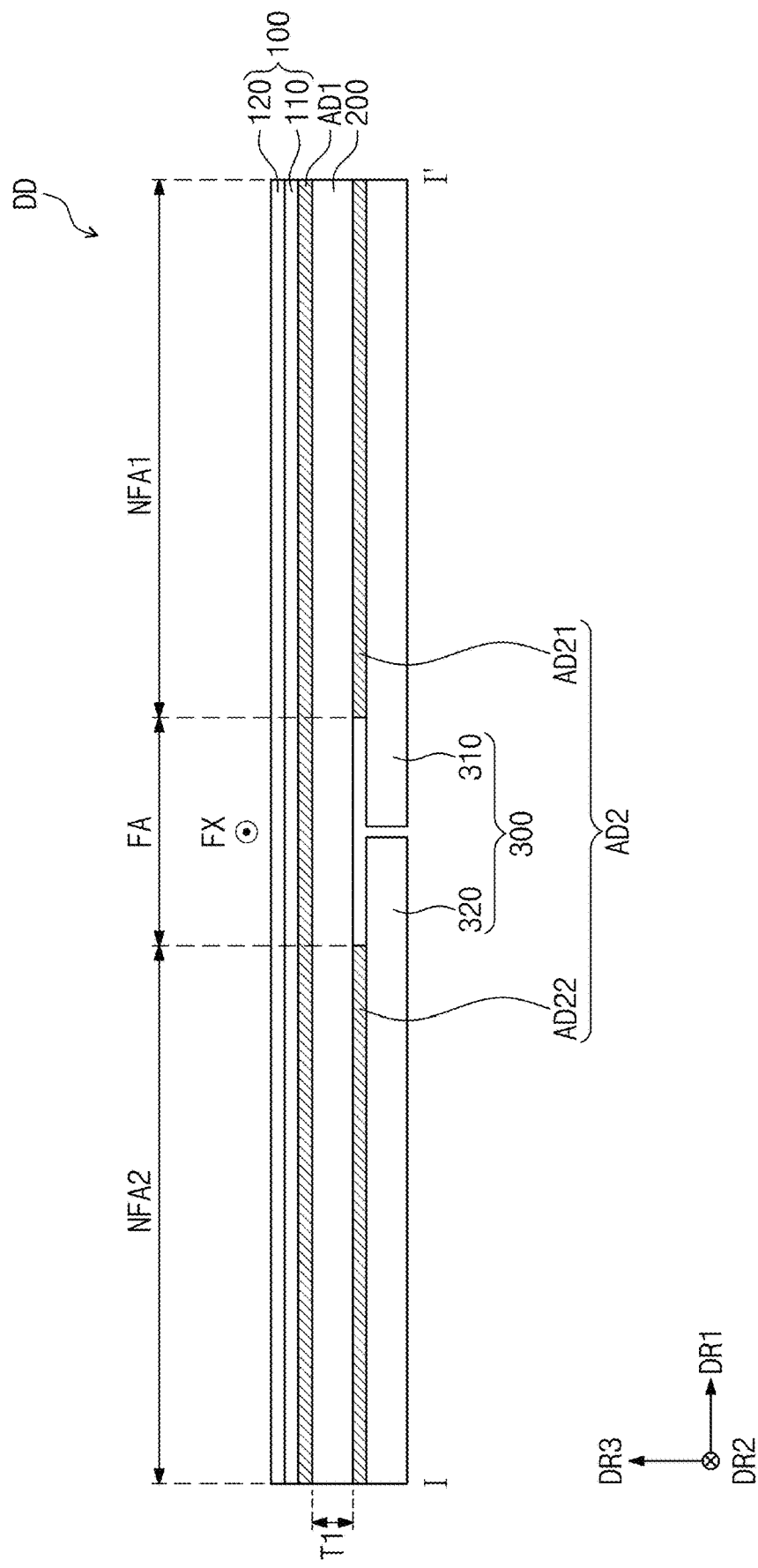
FIG. 5 is a cross-sectional view along a line I-I' of FIG. 1.
Figure 6:
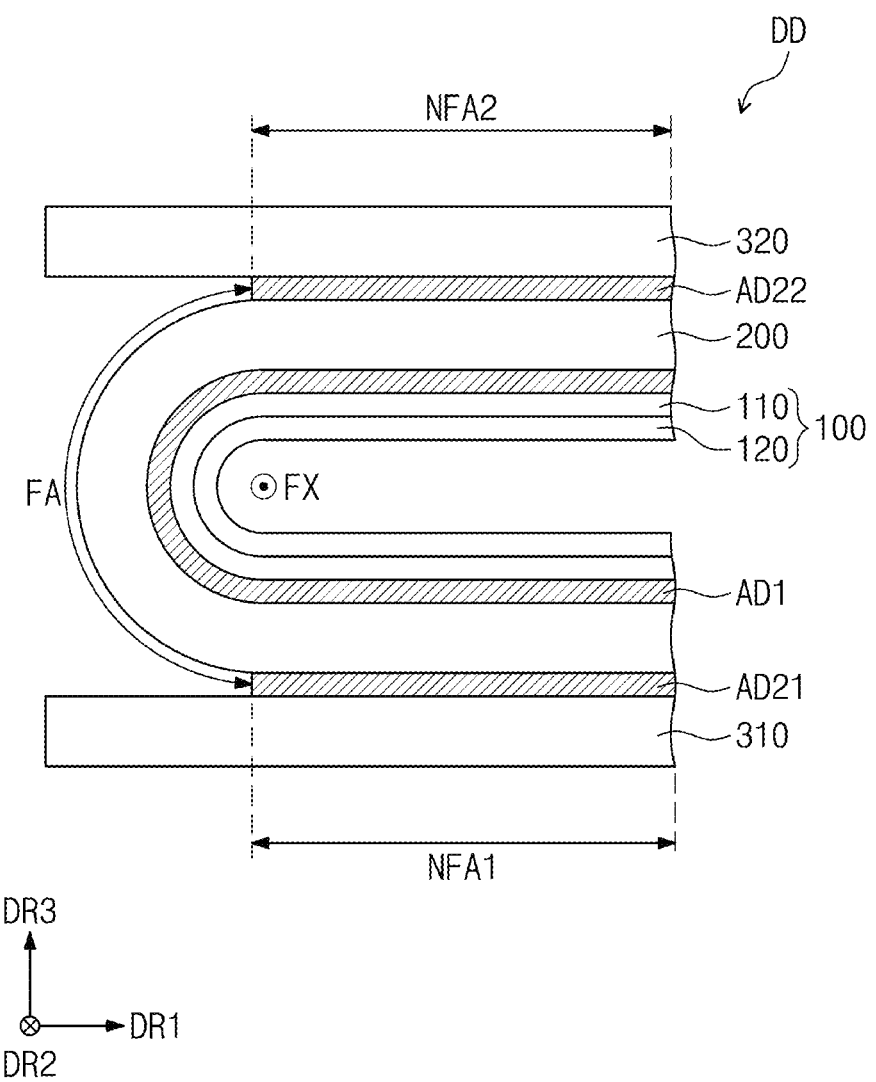
FIG. 6 is a cross-sectional view of an embodiment of an end portion of the display device illustrated in FIG. 5, which is in-folded.

FIG. 5 is a cross-sectional view along a line I-I' of FIG. 1. FIG. 5 shows the display device DD which is unfolded or flat. FIG. 6 is an enlarged cross-sectional view showing an embodiment of an end portion of the display device DD in FIG. 5 which is in-folded. FIGS. 5 and 6 illustrate only main elements among the elements of the display device DD shown in FIG. 1, and other components are omitted for convenience of illustration.

Referring to FIGS. 5 and 6, the misalignment compensation member 200 is disposed to correspond to an entirety of the bottom surface of the display panel 110 (e.g., an entirety of a planar area of the display panel 110), in the display device DD which is disposed unfolded or flat. The support member 300 includes a first support plate 310 and a second support plate 320. The first support plate 310 is disposed to overlap or correspond to a first side of the display module 100 along the first direction DR1. The first support plate 310 is disposed under the bottom surface of the misalignment compensation member 200 so as to overlap or correspond to a first portion of the folding area FA and to the first non-folding area NFA1 of the display module 100. The second support plate 320 is disposed to overlap or correspond to a second side of the display module 100 which is opposite to the first side, along the first direction DR1. The second support plate 320 is disposed under the bottom surface of the misalignment compensation member 200 so as to overlap or correspond to a second portion of the folding area FA and to the second non-folding area NFA2 of the display module 100. The misalignment compensation member 200 is foldable together with the display module 100 and the support member 300, to define an end portion of the display device DD at which the display module 100 is bent or curved.

A second adhesive member AD2 (e.g., second adhesive layer) is disposed between the misalignment compensation member 200 and the support member 300 to couple the misalignment compensation member 200 and the support member 300 to each other. The second adhesive member AD2 includes a first sub-adhesive member AD21 (e.g., first adhesive sub-layer) and a second sub-adhesive member AD22 (e.g., second adhesive sub-layer). The first sub-adhesive member AD21 is disposed between the misalignment compensation member 200 and the first support plate 310, and couples the misalignment compensation member 200 and the first support plate 310 to each other. The second sub-adhesive member AD22 is disposed between the misalignment compensation member 200 and the second support plate 320, and couples the misalignment compensation member 200 and the second support plate 320 to each other.

The first sub-adhesive member AD21 is disposed only in the first non-folding area NFA1, and the second sub-adhesive member AD22 is disposed only in the second non-folding area NFA2. The first support plate 310 and the second support plate 320 extend from the first non-folding area NFA1 and the second non-folding area NFA2, into the folding area FA, to dispose respective ends of the first support plate 310 and the second support plate 320 in the folding area FA. The first support plate 310 and the second support plate 320 extend further than ends of the first sub-adhesive member AD21 and the second sub-adhesive member AD22, respectively. The display device DD which is unfolded or flat (FIG. 5), disposes each of the first support plate 310 and the second support plate 320 separated from the folding area FA of the display module 100, along a thickness direction of the display device DD. Furthermore, the first support plate 310 and the second support plate 320 are separated from each other in a direction along the display module 100 (e.g., along the first direction DR1).

Accordingly, when the display device DD is folded (FIG. 6), the first support plate 310 and the second support plate 320 may be further separated from the folding area FA of the display module 100. The display device DD which is folded (FIG. 6), disposes the first support plate 310 and the second support plate 320 at the end portion of the display device DD, facing each other along a thickness direction of the display device DD.

Figure 7A:
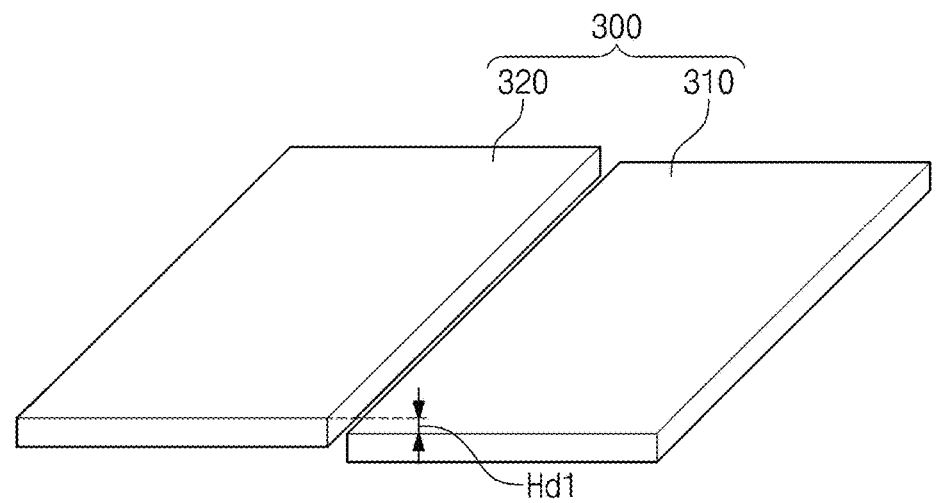
FIGS. 7A and 7B exemplarily show relationships between a first support plate and a second support plate shown in FIG. 6.
Figure 7B:
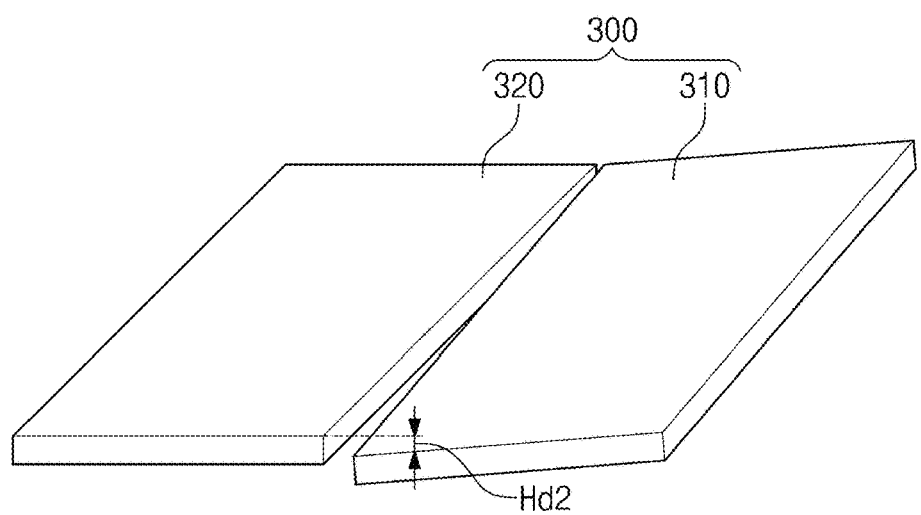

FIGS. 7A and 7B exemplarily show relationships between the first support plate 310 and the second support plate 320 shown in FIG. 6.

Referring to FIGS. 5, 7A, and 7B, misalignments Hd1 and Hd2 may be generated between the first support plate 310 and the second support plate 320, which are caused by an error in a manufacturing process or a fitting tolerance in an assembly process within a method of manufacturing a display device DD. The misalignments Hd1 and Hd2 may be several tens to several hundreds of micrometers (μm), such as ±about 50 μm to about ±about 100 μm. Such misalignment values may be distances between top surfaces of the first support plate 310 and the second support plate 320 as illustrated in FIGS. 7A and 7B, and may represent minimum distances between such top surfaces, without being limited thereto.

The misalignments Hd1 and Hd2 generated between the first support plate 310 and the second support plate 320 have an influence on the display module 100 within a display device DD, to lower the surface quality of the display module 100. In particular, when the first support plate 310 and the second support plate 320 within a display device DD which is disposed unfolded or flat, are misaligned as shown in FIG. 7A or FIG. 7B, a curve between the folding area FA and the first non-folding area NFA1 and/or the second non-folding area NFA2 may be viewable from outside the display device DD which is unfolded or flat.

The display device DD according to one or more embodiment may include the misalignment compensation member 200 to compensate for a misalignment between the first support plate 310 and the second support plate 320, such as the misalignments Hd1 and Hd2 exemplary shown in FIGS. 7A and 7B.

Figure 8:
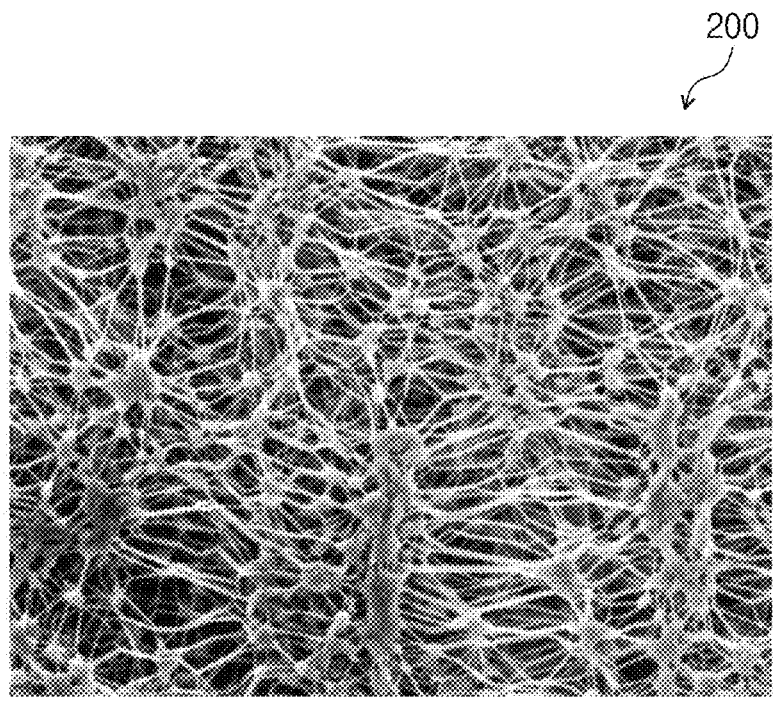
FIG. 8 illustrates an enlarged to plan view of an embodiment of a misalignment compensation member.

FIG. 8 illustrates an enlarged planar view of the misalignment compensation member 200.

Referring to FIGS. 5 and 8, the misalignment compensation member 200 may be a water-resistant fiber of which a dimension of a gas pocket defined by portions of the misalignment compensation member 200 is smaller than a dimension of a water molecule. If necessary, the surface of the fiber to be used in the misalignment compensation member 200 (e.g., an outer surface) may be water-repellent, such as including a water-repellent coating. The misalignment compensation member 200 may include a fiber of relatively high density and high elasticity so as to compensate for the misalignment between the first support plate 310 and the second support plate 320, and maintain a surface quality of the display module 100 to a prescribed level (e.g., Kc of about 0.5 or smaller, and Kd of about 0.5 or smaller). In an embodiment, the misalignment compensation member 200 which includes an elastic fiber and is between the display module 100 and the first support plate 310 and between the display module 100 and the second support plate 320, maintains a surface quality of the display module 100 within about 0.5 or smaller for range Kc and about 0.5 or smaller for range Kd.

A thickness T1 of the misalignment compensation member 200 (refer to FIG. 5) may be set to a dimension which is sufficient to compensate for the misalignment between the first support plate 310 and the second support plate 320. In an embodiment, for example, the thickness T1 may be about 30 μm to about 300 μm. That is, the misalignment compensation member 200 which includes an elastic fiber and is between the display module 100 and the first support plate 310 and between the display module 100 and the second support plate 320, includes a thickness of about 30 μm to about 300 μm.

In this way, since the misalignment compensation member 200 includes a fiber of a relatively high density and including a relatively high elasticity material, the top surface of the misalignment compensation member 200 may be flat or have a gradual slope to minimize a curve between the folding area FA and the first non-folding area NFA1 and/or the second non-folding area NFA2 of the display module 100, even though a misalignment is generated between the first support plate 310 and the second support plate 320. Accordingly, degradation of the display quality of the display device DD may be reduced or effectively prevented.

Figure 9:
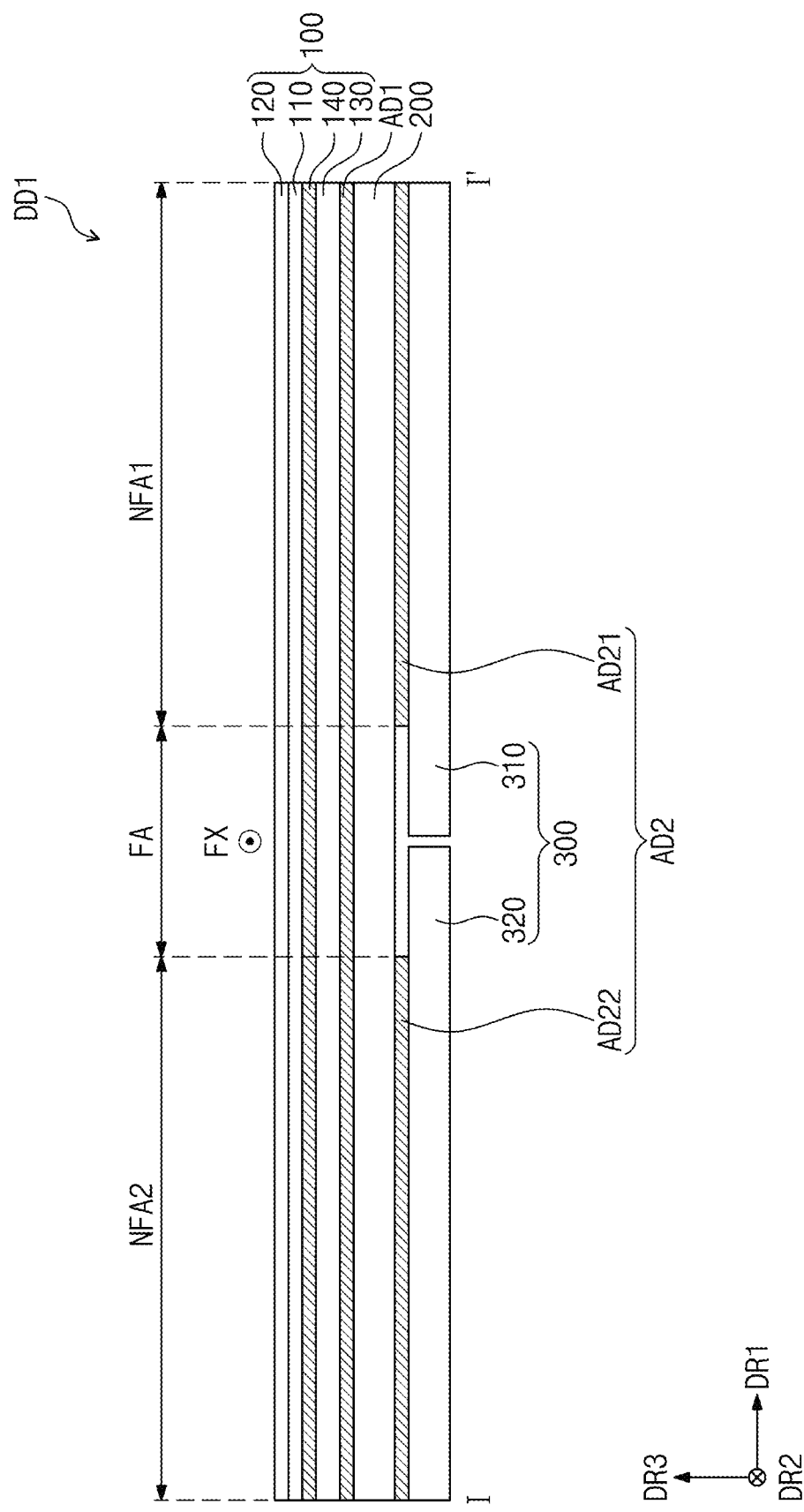
FIG. 9 is a cross-sectional view along a line I-I' of FIG. 1 showing an embodiment of a display device.

FIG. 9 is a cross-sectional view along a line I-I' of FIG. 1 showing an embodiment of a display device DD1. Among elements of the display device DD1 shown in FIG. 9, elements identical to those of the display device DD shown in FIG. 5 are referred to with the same reference numerals.

Referring to FIG. 9, the display module 100 may further include a cushion layer 130 and a cushion adhesive layer 140 as described in FIG. 4.

The cushion layer 130 is disposed under the display panel 110 and the cushion adhesive layer 140 may bond the display panel 110 and the cushion layer 130 to each other. The misalignment compensation member 200 may be disposed to correspond to an entirety of the bottom surface of the cushion layer 130, e.g., an entirety of a planar area of the cushion layer 130. The first adhesive member AD1 may be disposed under the bottom surface of the display module 100, namely, between the bottom surface of the cushion layer 130 and the misalignment compensation member 200. The first adhesive member AD1 combines the cushion layer 130 and the misalignment compensation member 200 to each other at the bottom surface of the cushion layer 130 and the top surface of the misalignment compensation member 200. The first adhesive member AD1 may include a thermosetting resin or a photo-curable resin.

The cushion layer 130 may absorb a shock applied to the bottom surface of the display panel 110 to protect the display panel 110, and the misalignment compensation member 200 may compensate for a misalignment between the first support plate 310 and the second support plate 320. Accordingly, the display quality of the display device DD1 may be enhanced.

Figure 10:
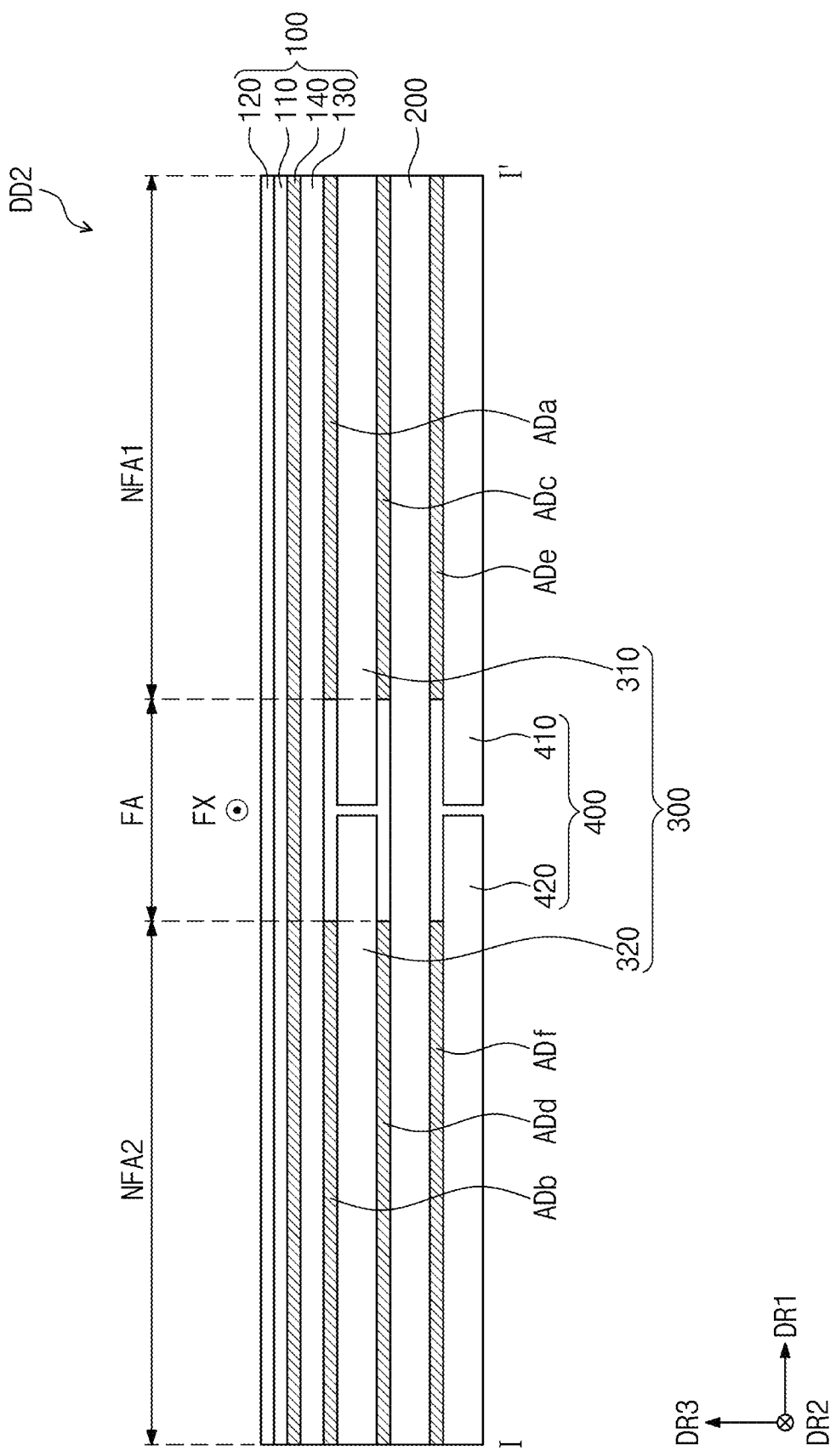
FIG. 10 is a cross-sectional view along a line I-I' of FIG. 1 showing an embodiment of a display device.

FIG. 10 is a cross-sectional view along a line I-I' of FIG. 1 showing an embodiment of a display device DD2. Among elements of the display device DD2 shown in FIG. 10, elements identical to those of the display device DD1 shown in FIG. 9 are referred to with the same reference numerals.

In an exemplary embodiment, the first support plate 310 is disposed under the display module 100 at a first side thereof, namely, at the bottom surface of cushion layer 130 so as to overlap or correspond to a first portion of the folding area FA and the first non-folding area NFA1 of the display module 100. The second support plate 320 is disposed to overlap or correspond to a second side of the display module 100 which is opposite to the first side along the first direction DR1. The second support plate 320 is disposed under the display module 100, namely, at the bottom surface of the cushion layer 130 so as to overlap or correspond to a second portion of the folding area FA and the second non-folding area NFA2 of the display module 100.

The display device DD2 includes the frame 400, as shown for the display device DD shown in FIG. 1. The frame 400 is disposed under the misalignment compensation member 200. The frame 400 may include a first frame 410 and a second frame 420.

The first frame 410 overlaps or corresponds to the first portion of the folding area FA and the first non-folding area NFA1 of the display module 100. In other words, the first frame 410 may support portions of the folding area FA and the first non-folding area NFA1 of the display module 100, the first support plate 310 and the misalignment compensation member 200. The second frame 420 may overlap or correspond to a second portion of the folding area FA and the second non-folding area NFA2 of the display module 100. The second frame 420 may support portions of the folding area FA and the second non-folding area NFA2 of the display module 100, the second support plate 320 and the misalignment compensation member 200. The display device DD2 which is unfolded or flat disposes the first frame 410 and the second frame 420 separated from each other along the first direction DR1.

A third adhesive member ADa is disposed between the cushion layer 130 and the first support plate 310. A fourth adhesive member ADb is disposed between the cushion layer 130 and the second support plate 320. In other words, the third adhesive member ADa and the fourth adhesive member ADb combine the cushion layer 130 and the support member 300 to each other at the bottom surface of the cushion layer 130, and each of the top surfaces of the first support plate 310 and the second support plate 320, respectively.

A fifth adhesive member ADc is disposed between the first support plate 310 and the misalignment compensation member 200. A sixth adhesive member ADd is disposed between the second support plate 320 the misalignment compensation member 200. In other words, the fifth adhesive member ADc and the sixth adhesive member ADd combine the misalignment compensation member 200 and the support member 300 to each other at the top surface of the misalignment compensation member 200, and each of the bottom surfaces of the first support plate 310 and the second support plate 320, respectively.

A seventh adhesive member ADe is disposed between the misalignment compensation member 200 and the first frame 410. An eighth adhesive member ADf is disposed between the misalignment compensation member 200 and the second frame 420. In other words, the seventh adhesive member ADe and the eighth adhesive member ADf combine the misalignment compensation member 200, at the bottom surface of the misalignment compensation member 200, and each of the top surfaces of the first frame 410 and the second frame 420, respectively.

Referring to FIG. 10, spaces may be respectively defined at the folding area FA, between ends of the first support plate 310 and the second support plate 320 which face each other, between ends of the first frame 410 and the second frame 420 which face each other, between ends of the third adhesive member ADa and the fourth adhesive member ADb which face each other, between ends of the fifth adhesive member ADc and the sixth adhesive member ADd which face each other, and between ends of the seventh adhesive member ADe and the eighth adhesive member ADf which face each other.

Similar to that discussed above for the support member 300, a misalignment may be generated between the first frame 410 and the second frame 420 due to an error in a manufacturing process or a fitting tolerance in an assembly process, or the like, within a method of manufacturing the display device DD2. Since the misalignment compensation member 200 may be disposed corresponding to the first frame 410 and the second frame 420 to compensate for the misalignment between the first frame 410 and the second frame 420, the display quality of the display device DD2 may be enhanced.

A display device DD having a configuration according to one or more embodiment of the invention, may include a misalignment compensation member 200 to compensate for a misalignment between a folding region and a non-folding region, within the display device DD which is disposed unfolded or flat. Accordingly, the image quality of the display device DD may be improved. In particular, the misalignment compensation member 200 is provided or formed with a fiber having elasticity and relatively high density to maximize a misalignment compensation effect.

Although embodiments of the invention have been described, it is understood that the invention should not be limited to these embodiments but various changes and modifications can be made by one ordinary skilled in the art within the spirit and scope of the invention as hereinafter claimed. In addition, embodiments are not intended to limit the technical spirit of the invention, and the protection scope of the invention should be interpreted based on the following appended claims and it should be appreciated that all technical spirits included within a range equivalent thereto are included in the protection scope of the invention.

What is claimed is:

1. A display device comprising:
    a display module which displays an image, the display module comprising:
        a folding region at which the display module is foldable and unfoldable, and
        a first non-folding region and a second non-folding region facing each other along a first direction with the folding region therebetween;
    a misalignment compensation member comprising an elastic fiber;
    a first support plate facing the first non-folding region of the display module with the misalignment compensation member therebetween; and
    a second support plate separated from the first support plate along the first direction and facing the second non-folding region of the display module with the misalignment compensation member therebetween.

2. The display device of claim 1, wherein the display module which is unfolded disposes the misalignment compensation member corresponding to each of the first non-folding region, the second non-folding region and the folding region of the display module.

3. The display device of claim 2, wherein the misalignment compensation member which comprises the elastic fiber and is between the display module and the first support plate and between the display module and the second support plate, includes a thickness of about 30 micrometers to about 300 micrometers.

4. The display device of claim 1, further comprising a first adhesive member between the misalignment compensation member and the display module.

5. The display device of claim 1, further comprising:
    a first sub-adhesive member between the misalignment compensation member and the first support plate; and
    a second sub-adhesive member between the misalignment compensation member and the second support plate.

6. The display device of claim 1, wherein the misalignment compensation member which comprises the elastic fiber and is between the display module and the first support plate and between the display module and the second support plate, maintains a surface quality of the display module of about 0.5 or smaller for Kc and about 0.5 or smaller for Kd.

7. The display device of claim 1, wherein within the misalignment compensation member which is between the display module and the first support plate and between the display module and the second support plate, the elastic fiber comprises a water-resistant fiber.

8. The display device of claim 1, wherein a rigidity of each of the first support plate and the second support plate, is larger than a rigidity of the display module.

9. The display device of claim 1, wherein
    the display module comprises a display surface at which the image is displayed, and
    the display module which is in-folded disposes portions of the display surface facing each other.

10. The display device of claim 1, wherein the display module further comprises:
    a display panel which generates and displays the image;
    a cushion layer facing the display panel; and
    a cushion adhesive layer between the display panel and the cushion layer.

11. The display device of claim 10, wherein the cushion layer comprises polyurethane, plastic polyurethane or urethane rubber.

12. A display device comprising:
    a display module which displays an image, the display module comprising:
        a folding region at which the display module is foldable and unfoldable, and
        a first non-folding region and a second non-folding region facing each other along a first direction with the folding region therebetween;
    a support member which faces the first non-folding region and the second non-folding region of the display module;
    a misalignment compensation member comprising an elastic fiber, the misalignment compensation member facing the display module with the support member therebetween;
    a first frame facing the support member at the first non-folding region, with the misalignment compensation member therebetween; and
    a second frame separated from the first frame along the first direction and facing the support member at the second non-folding region, with the misalignment compensation member therebetween.

13. The display device of claim 12, wherein the support member comprises:
    a first support plate facing the first non-folding region of the display module; and
    a second support plate facing the second non-folding region of the display module.

14. The display device of claim 13, further comprising:
    a first adhesive member between the display module and the first support plate; and
    a second adhesive member between the display module and the second support plate.

15. The display device of claim 13, further comprising:
a third adhesive member between the first support plate and the misalignment compensation member; and
a fourth adhesive member between the second support plate and the misalignment compensation member.

16. The display device of claim 13, wherein a rigidity of each of the first support plate and the second support plate, is larger than a rigidity of the display module.

17. The display device of claim 12, further comprising:
a fifth adhesive member between the misalignment compensation member and the first frame; and
a sixth adhesive member between the misalignment compensation member and the second frame.

18. The display device of claim 12, wherein the display module further comprises:
a display panel which generates and displays the image;
a cushion layer facing the display panel; and
a cushion adhesive layer between the display panel and the cushion layer.

19. The display device of claim 12, wherein
the display module comprises a display surface at which the image is displayed, and
the display module which is in-folded disposes portions of the display surface facing each other.

20. The display device of claim 12, wherein
within the misalignment compensation member which faces the display module with the support member therebetween, the elastic fiber comprises a water-resistant fiber, and
the misalignment compensation member which faces the display module with the support member therebetween, maintains a surface quality of the display module of about 0.5 or smaller for Kc and about 0.5 or smaller for Kd.

* * * * *